(12) United States Patent
Mathur

(10) Patent No.: US 10,514,884 B2
(45) Date of Patent: Dec. 24, 2019

(54) MULTI SOURCE WIRELESS HEADPHONE AND AUDIO SWITCHING DEVICE

(71) Applicant: Harman International Industries, Incorporated, Stamford, CT (US)

(72) Inventor: Abhay Mathur, Karnataka (IN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 0 days.

(21) Appl. No.: 15/567,661

(22) PCT Filed: Apr. 22, 2016

(86) PCT No.: PCT/US2016/028811
§ 371 (c)(1),
(2) Date: Oct. 19, 2017

(87) PCT Pub. No.: WO2016/172457
PCT Pub. Date: Oct. 27, 2016

(65) Prior Publication Data
US 2018/0088897 A1    Mar. 29, 2018

(30) Foreign Application Priority Data
Apr. 22, 2015   (IN) .......................... 2064/CHE/2015

(51) Int. Cl.
*G06F 3/16* (2006.01)
*H04R 5/033* (2006.01)
(Continued)

(52) U.S. Cl.
CPC ........... *G06F 3/165* (2013.01); *H04R 1/1041* (2013.01); *H04R 3/00* (2013.01); *H04R 5/033* (2013.01);
(Continued)

(58) Field of Classification Search
None
See application file for complete search history.

(56) References Cited

U.S. PATENT DOCUMENTS

2003/0223604 A1* 12/2003 Nakagawa .......... H04M 1/6066
381/311
2004/0203351 A1* 10/2004 Shearer ............... H04M 1/6066
455/41.1
(Continued)

FOREIGN PATENT DOCUMENTS

KR           100815442 B1      3/2008

OTHER PUBLICATIONS

"Internet Radio." Wikipedia, Apr. 10, 2015, en.wikipedia.org/w/index.php?title=Internet_radio&oldid=655852120. (Year: 2015).*

*Primary Examiner* — James K Mooney
(74) *Attorney, Agent, or Firm* — Brooks Kushman P.C.

(57) ABSTRACT

In at least one embodiment, an apparatus is provided that includes headphones. The headphones are programmed to playback first audio from an audio switching device that is electrically paired to a first audio source that provides the first audio and to receive a first signal from the audio switching device that is electrically paired to a second audio source. The first signal is indicative of a request to transmit second audio from the second audio source while the headphones playback the first audio. The headphones are further programmed to generate an alert to notify a user of the request in response to the first signal and to transmit a second signal to the audio switching device indicative of a first command to one of receive the second audio at the headphones for playback and reject the request to transmit the second audio.

8 Claims, 5 Drawing Sheets

(51) Int. Cl.
  *H04R 1/10*  (2006.01)
  *H04R 3/00*  (2006.01)
(52) U.S. Cl.
  CPC ...... *H04R 2420/01* (2013.01); *H04R 2420/07* (2013.01)

(56) References Cited

U.S. PATENT DOCUMENTS

| | | | |
|---|---|---|---|
| 2005/0070327 A1* | 3/2005 | Watanabe | H04M 1/0245 455/552.1 |
| 2007/0149261 A1 | 6/2007 | Huddart | |
| 2007/0154052 A1* | 7/2007 | Gantz | H04R 1/1033 381/384 |
| 2008/0215777 A1 | 9/2008 | Richenstein et al. | |
| 2010/0189273 A1 | 7/2010 | Statham et al. | |
| 2010/0250253 A1* | 9/2010 | Shen | H04R 1/1041 704/260 |
| 2013/0303096 A1* | 11/2013 | Foster | H04R 1/1091 455/149 |
| 2013/0322648 A1* | 12/2013 | Chukka | H04L 65/60 381/77 |
| 2014/0003629 A1* | 1/2014 | Reilly | H03G 3/02 381/107 |
| 2015/0189421 A1* | 7/2015 | Chou | H04R 1/1041 704/275 |
| 2015/0249882 A1* | 9/2015 | Patil | G10L 15/26 381/123 |

* cited by examiner

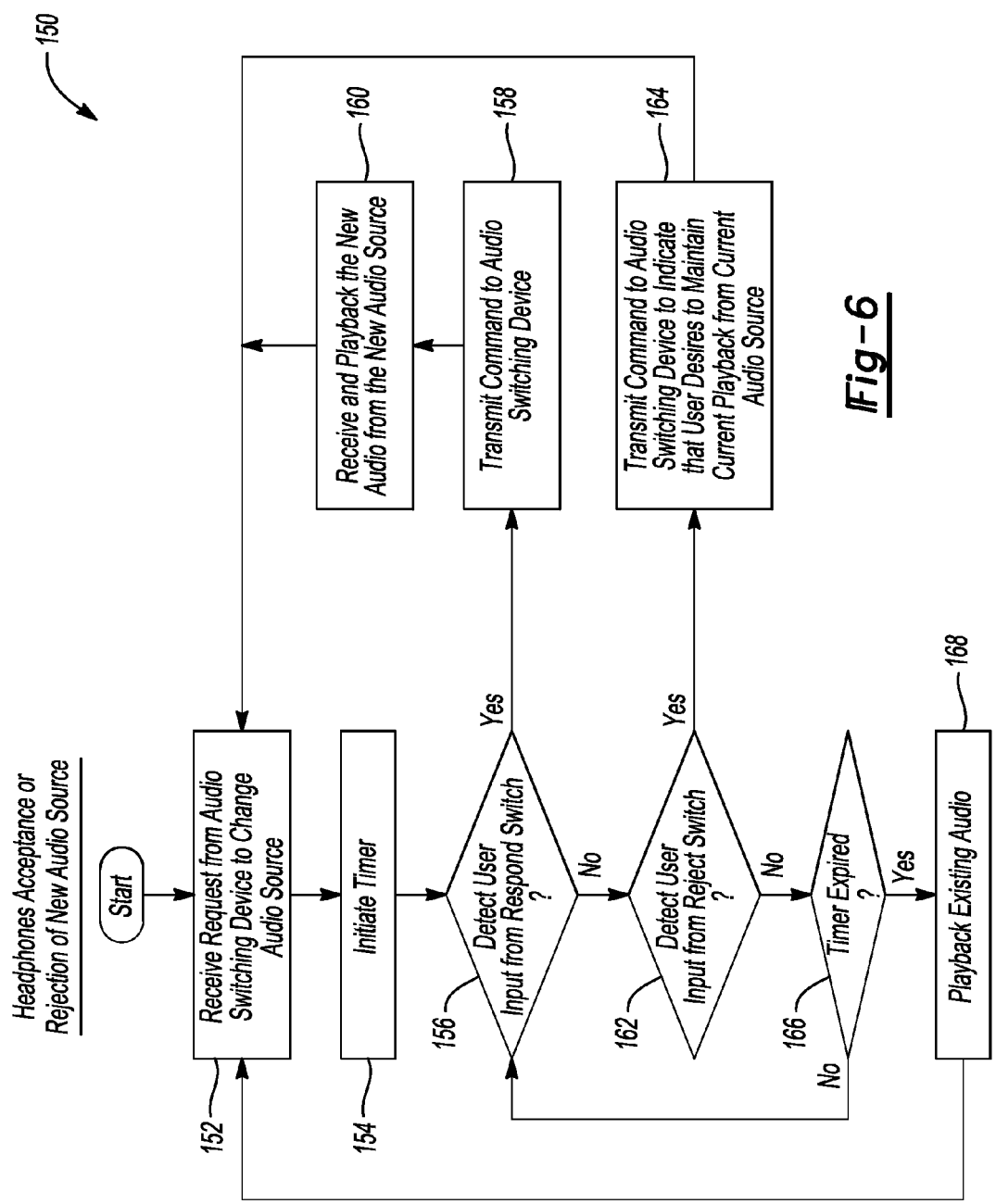

MULTI SOURCE WIRELESS HEADPHONE AND AUDIO SWITCHING DEVICE

CROSS-REFERENCE TO RELATED APPLICATIONS

This application is the U.S. national phase of PCT Application No. PCT/US2016/028811 filed on Apr. 22, 2016, which claims priority to IN Patent Application No. 2064/CHE/2015 filed on Apr. 22, 2015; the disclosures of which are incorporated in their entirety by reference herein.

TECHNICAL FIELD

Aspects disclosed herein generally relate to a wireless headphone and audio switching device that enables the switching of various audio sources for playback of audio on the headphones. These aspects and others will be discussed in more detail herein.

BACKGROUND

While individuals today possess more than one smart device such as, for example, smart phones, tablets, laptops, portable music players, etc. most of these devices have at least one output for wirelessly providing audio to headphones in accordance to a wireless protocol (e.g., Bluetooth, etc.). The need to switch from various smart devices that provide audio to the headphones is frequent, thus, making such a process difficult to pair (or disconnect). Specifically, to change the corresponding smart device that serves as the source of audio for the headphones, it is necessary to electrically pair each smart device to the headphones in order for the headphones to properly receive the audio from the smart device. The user is either compelled to utilize multiple headphones that are each individually paired to a particular smart device or use the smart device directly without the use of the headphones. Such an experience may spoil the overall experience of music and communication to the headphones.

SUMMARY

In at least one embodiment, an apparatus is provided that includes headphones. The headphones are programmed to playback first audio from an audio switching device that is electrically paired to a first audio source that provides the first audio and to receive a first signal from the audio switching device that is electrically paired to a second audio source. The first signal is indicative of a request to transmit second audio from the second audio source while the headphones playback the first audio. The headphones are further programmed to generate an alert to notify a user of the request in response to the first signal and to transmit a second signal to the audio switching device indicative of first command to either receive the second audio at the headphones for playback or reject the request to transmit the second audio.

In at least another embodiment, an apparatus is provided that includes headphones. The headphones include a first switch positioned thereon. The headphones are programmed to: transmit a first signal to an audio switching device that is electrically paired to a plurality of audio sources in response to the first switch being selected. The first signal is indicative of a first command to receive first audio via the audio switching device from a first audio source. The headphones are further programmed to receive the first audio from the audio switching device after transmitting the first signal to the audio switching device.

In at least another embodiment, a computer-program product embodied in a non-transitory computer readable medium that is programmed for communicating with a plurality of audio sources to transmit audio from each of the audio sources to headphones is provided. The computer-program product includes instructions to wirelessly receive an indication from a first audio source to provide first audio to the headphones and to generate an alert on a display to notify a user of the headphones of the indication from the first audio source to provide the first audio to the headphones. The computer-program product further includes instructions to wirelessly transmit a first signal to the headphones in response to the indication to request the headphones to playback the first audio from the headphones and to wirelessly receive a second signal from the headphones indicative of a command to provide the first audio or to reject receiving the first audio.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

FIG. 6 generally depicts an operational flow of the headphones in accordance to another embodiment.

DETAILED DESCRIPTION

Figure 1:
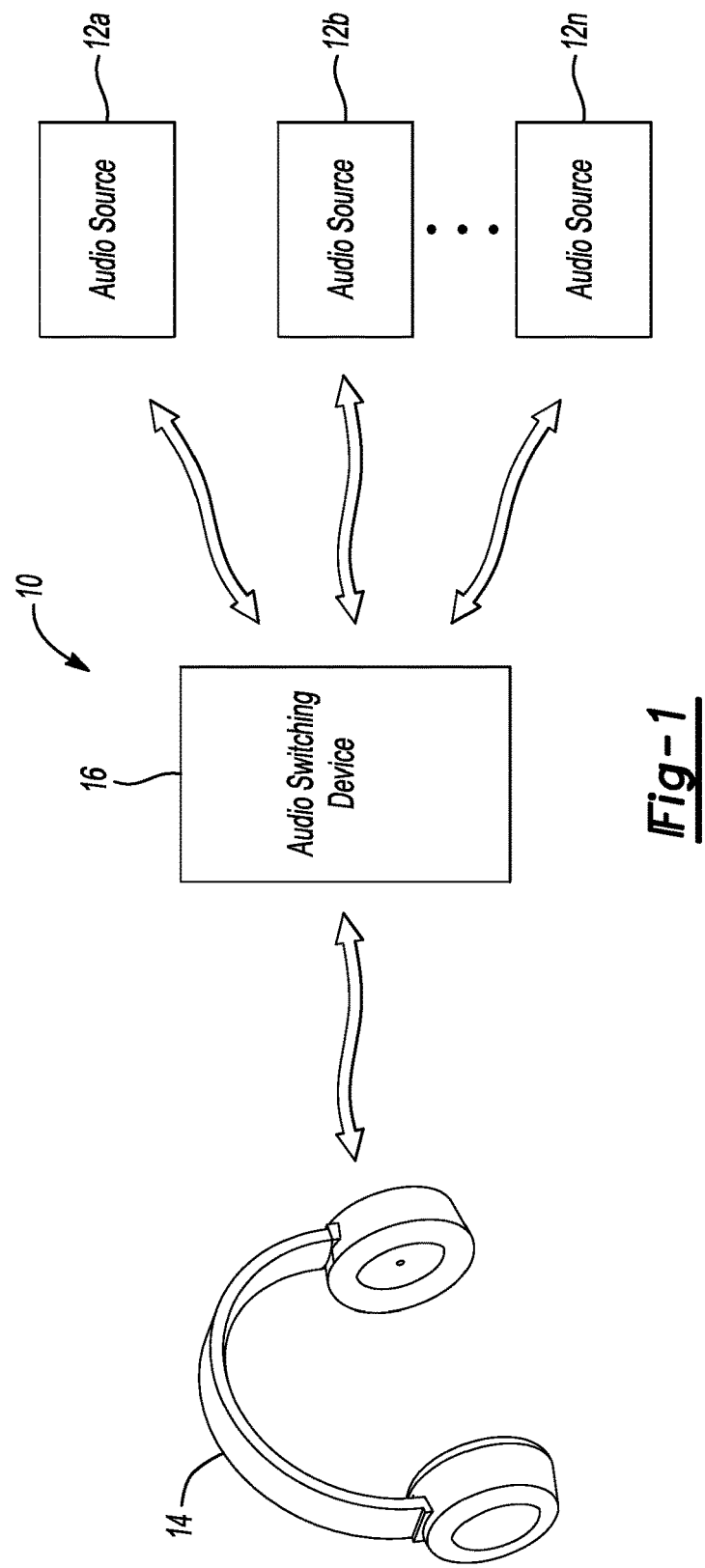
FIG. 1 generally depicts a system for switching audio sources in accordance to one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices may be configured to execute a computer-program that is embodied in a non-transitory computer readable medium that is programmed to perform any number of the functions as disclosed.

Aspects provided herein provide, among other things, an audio switching device that executes an application to enable any number of audio sources to provide audio (any audible signal such as music, voice, etc.) to wireless headphones without the need to perform an additional step of electrically pairing the headphones to each audio source. For example, the headphones are wirelessly coupled to the audio switching device via a wireless protocol such as, but not limited to Bluetooth®. The audio switching device is programmed to execute instructions to enable communication with any number of audio sources that desire to provide audio to the headphones for playback without the need to electrically pair the audio sources to the headphones. Therefore, the headphones may only be paired to the audio switching device while the audio switching device itself is electrically paired to a plurality of the audio sources. This condition enables the headphones to switch, via the audio switching device to a new audio source without the nuisance of electrically pairing the headphones to the audio source.

FIGS. 1 generally depicts a system 10 for switching a plurality of audio sources 12a-12n in accordance to one embodiment. The system 10 includes headphones 14 and an audio switching device 16. The audio sources 12a-12n are generally arranged to output audio signal for receipt by the audio switching device 16. The audio switching device 16 may then output the audio signal to the headphones 14 for playback. It is recognized that the audio switching device 16 may only enable the transmission of audio to the headphones 14 one audio source at a time. Meaning, the audio switching device 16 may only transmit an audio stream from a single audio source 12 to the headphones 14. The headphones 14 may transmit a command to the audio switching device 16 to select which of the audio sources 12 provide the audio.

In general, the headphones 14 and the audio switching device 16 may engage in bi-directional communication via a wireless communication protocol such as, but not limited to, Bluetooth®. Conversely, the audio switching device 16 and the various audio sources 12a-12n may also engage in bi-directional communication via the wireless communication protocol such as but not limited to, Bluetooth®. The audio sources 12a-12n may also wirelessly transmit the audio data via the wireless communication protocol to the audio switching device 12. Similarly, the audio switching device 12 may also wirelessly transmit the audio data via the wireless communication protocol to the headphones 14 for playback for a user.

Any one of the corresponding audio sources 12a-12n may be implemented as a cellular telephone, laptop, desktop computer, tablet computer, portable music player, etc. Likewise, the audio switching device 16 may be implemented as a cellular telephone, laptop, desktop computer, tablet computer, portable music player, etc. The audio switching device 16 is generally programmed to execute instructions to pair itself with the various audio sources 12. The pair operation may be initiated via user interaction with the audio switching device 16 and the audio source(s) 12. For example, the user may individually pair a corresponding audio source 12 to the audio switching device 16 one at a time to enable communication with the various audio switching devices 16. Additionally, the audio switching device 16 is generally programmed to execute instructions to pair itself with the headphones 14. However, the headphones 14 may not be paired with the various audio sources 12. In this arrangement, the headphones 14 serve as a master device in that the headphones 14 select via the audio switching device 16 the corresponding audio source 12 that the headphones 14 desire to receive the audio from.

In addition, the audio switching device 16 may also serve as a notification device in that the audio switching device 16 notifies the headphones 14 of when a newly detected audio source 12 is ready to provide audio data. For example, assume the user is listening to a song on the headphones 14 and the song is provided by the audio source 12a through the audio switching device 16 which serves as an intermediary in this case. Further assume that the audio switching device 16 starts to receive new audio data such as a skype call or phone call from the audio source 12b (i.e., an iPad® in this case). The audio switching device 16 is configured to transmit a request or notification to the headphones 14 to alert the user of the incoming skype or phone call from the audio source 12b while the headphones 14 play back the audio as received from the audio source 12a. The headphones 14 may then generate an audio alert to notify the user of the incoming call from the audio source 12b. The audio switching device 16 may also provide a visual alert to the user of the headphones 14 to notify the user of the newly detected audio source 12. The user may select a switch (not shown) that is positioned on the headphones 14 to accept the incoming call from the audio source 12b. The headphones 14 transmit a signal to the audio switching device 16 to indicate acceptance of the incoming call. The audio switching device 16 disables receipt of the song from the previous audio source 12a and enables transmission of the incoming call to the headphones 14 from the newly detected audio source 12b. Once the call terminates, the user may select a second switch (not shown) on the headphones 14 to command the audio switching device 16 to enable receipt of the music from the audio source 12a.

Figure 2:
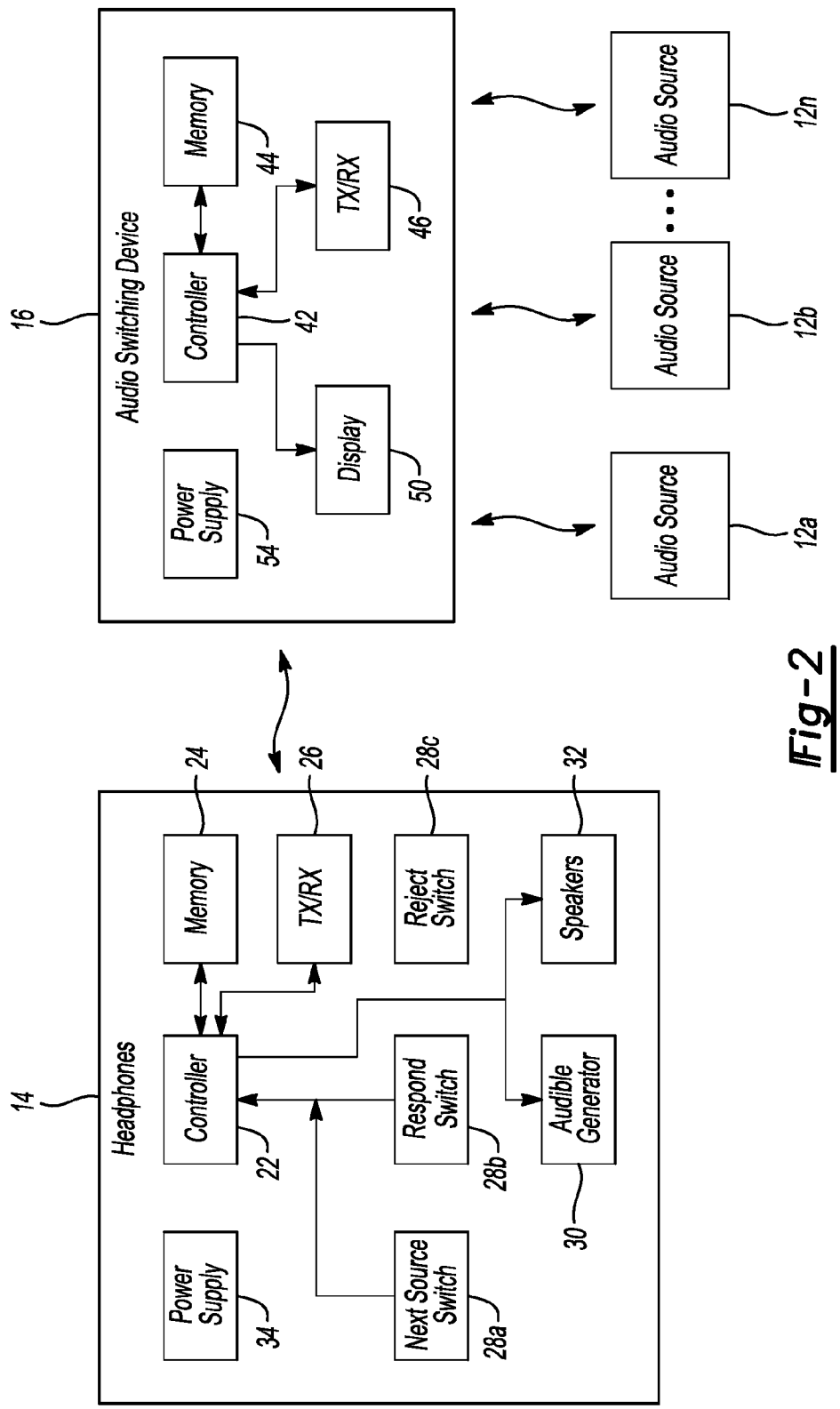
FIG. 2 generally depicts a more detailed implementation of the system in accordance to one embodiment.

FIG. 2 generally depicts a more detailed implementation of the system 10 in accordance to one embodiment. The headphones 14 include a controller 22 and memory 24. The memory 24 stores instructions for the headphones 14. The controller 22 executes instructions on the memory 24 for any number of the operations performed by the headphones 14. A transceiver 26 is provided to enable wireless bi-directional communication with the audio switching device 16. The transceiver 26 may be implemented as a Bluetooth® based transceiver or other suitable transceiver mechanism. The headphones 14 generally include a plurality of switches 28a, 28b, and 28c. It is recognized that the headphones 14 may include any number of switches 28. The switches 28a, 28b, and 28c may be positioned on an exterior portion of the headphones 14 to enable user selection thereof. The switch 28a may be implemented as a next source switch. For example, the user may select the next source switch 28a to command the audio switching device 16 to select a different audio source 12. The switch 28b may be implemented as a respond switch. In this case, the user may select the respond switch 28b in response to a request from the audio switching device 16 that notifies the user of the headphones 14 of the newly detected audio source 12 that is ready to provide new audio. By selecting the respond switch 28*b*, the headphones 14 may transmit a command to the audio switching device 16 to indicate acceptance of the request. The audio switching device 16 may then disable the previous audio source 12 that provides the audio and enables the newly detected audio source 12 to provide the new audio. The switch 28*c* may be implemented as a reject switch. The reject switch 28*c* provides the user the opportunity to reject the request from the audio switching device 16 to switch to the newly detected audio source 12.

The headphones 14 also include an audible generator 30 that generates an audible alert to the user in response to the audio switching device 16 transmitting the request to the headphones 14 of the newly detected audio source 12. The audible generator 30 transmits the audible alert via a speaker 32 on each headphone to the user. Additionally, the speaker 32 is arranged to playback the audio as provided by any of the audio sources 12 to the user. A power supply 34 is provided to power the controller 22, the memory 24, the transceiver 26, the switches 28, the audible generator 30, and the speakers 32.

The audio switching device 16 includes a controller 42 and memory 44. The memory 44 stores instructions for the audio switching device 16. The controller 42 executes the instructions on the memory 44 for executing any number of the operations performed herein. At least one transceiver 46 is provided to enable wireless bi-directional communication with the audio switching device 16 and any number of the audio sources 12. The transceiver 26 may be implemented as a Bluetooth® based transceiver or other suitable transceiver mechanism. It is recognized that additional transceivers may be positioned on the audio switching device 16 to enable bi-directional communication with a plurality of audio sources 12. A display 50 is provided on the audio switching device 16 to provide a visual alert in response to the audio switching device 16 receiving an indication from a new audio source 12 that is ready to provide new audio data to the headphones 14. A power supply 54 is provided to power the controller 42, the memory 44, the transceiver 46, and the display 50.

Figure 3:
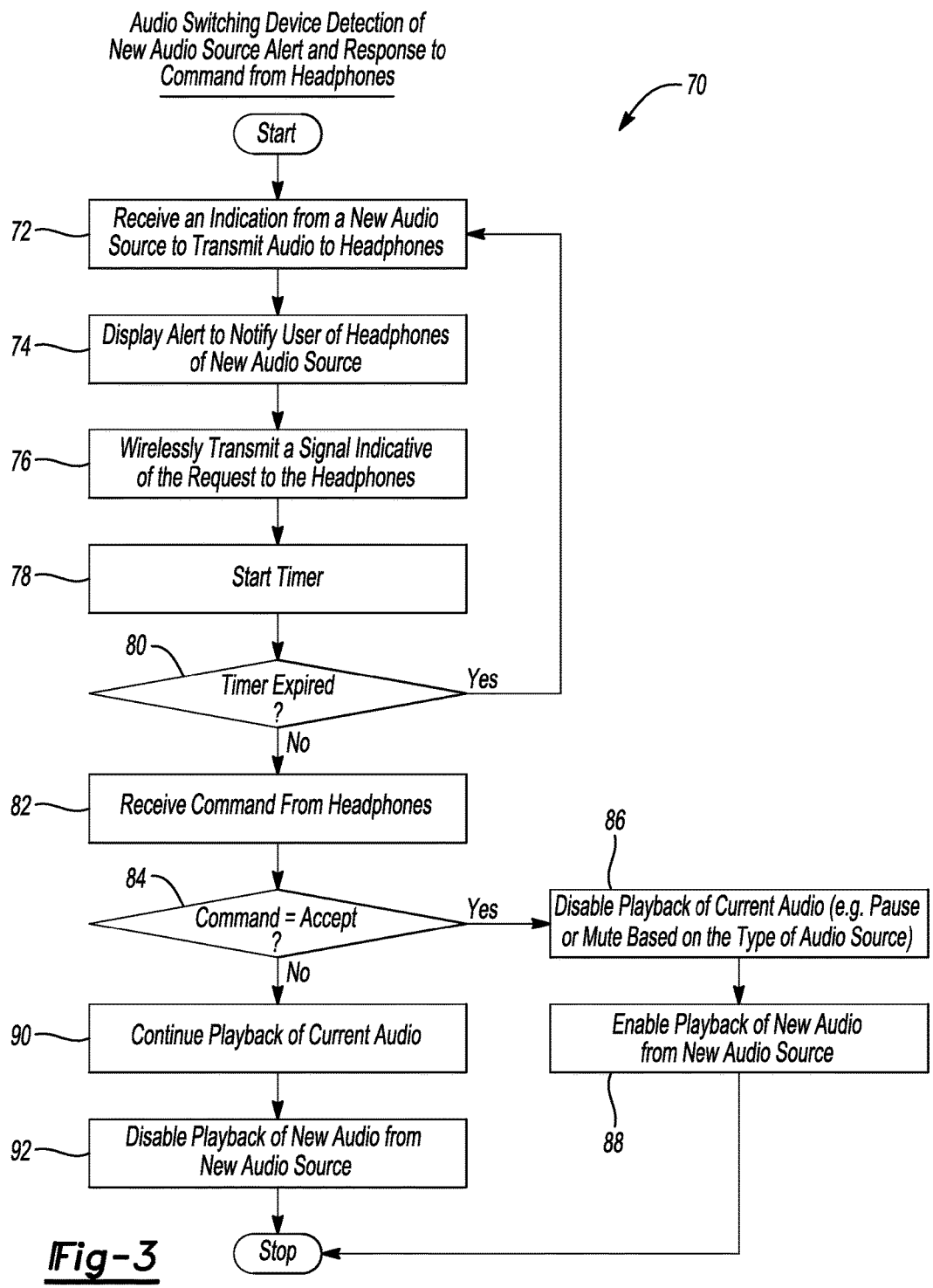
FIG. 3 generally depicts an operational flow of an audio switching device in accordance to one embodiment.

FIG. 3 generally depicts an operational flow 70 of the audio switching device 16 in accordance to one embodiment. The operational flow 70 generally illustrates, but is not limited to, detection of a new audio source 12, transmission of an alert or request to the headphones 14, and a response to the audio source 12 from the audio switching device 16 based on a command from the headphones 14.

In operation 72, the audio switching device 16 receives an indication from a newly detected audio source 12 to transmit new audio to the headphones 14.

In operation 74, the audio switching device 16 displays an alert to the user to notify the user that the newly detected audio source 12 is ready to transmit new audio to the headphones 14.

In operation 76, the audio switching device 16 wirelessly transmits a signal (or a request) to the headphones 14 to notify the headphones 14 that a new audio source 12 is ready to transmit the new audio to the headphones 14.

In operation 78, the audio switching device 16 initiates a timer to monitor for receipt of a command back from the headphones 14 in response to transmitting the signal to the headphones 14.

In operation 80, the audio switching device 16 determines whether the timer has expired before receiving a command back from the headphones 14. If the timer has expired, then the flow 70 moves back to operation 72 and this condition illustrates that no response has been received from the headphones. If the timer has not expired, then the flow 70 moves to operation 82.

In operation 82, the audio switching device 16 receives a command from the headphones 14.

In operation 84, the audio switching device 16 determines whether the command indicates an accept condition which serves as the user's approval to switch to the newly detected audio source 12. If the command is indicative of the accept condition, then the operational flow 70 moves to operation 86. If not, then the operation flow 70 moves to operation 90.

In operation 86, the audio switching device 16 disables the playback of audio from the previous audio source 12 that provided the audio prior to detecting the new audio source 12 so that the headphones 14 receives the new audio from the newly detected audio source 12. In other words, the audio switching device 16 may cease transmitting the audio from the previous audio source 12 to the headphones 14. In this example, the audio switching device 16 transmits a signal to the previous audio source 12 to command the previous audio source 12 to either pause or mute the audio provided therefrom. In general, the audio switching device 16 determines whether to pause or mute with the audio from the previous audio source 12 based on the type of audio provided. For example, the audio switching device 16 may control the audio source 12 to pause the audio if the audio source 12 provides audio via a local or remote network (e.g., cloud) such as audio in the form of MP3 songs, Ted Talks®, You Tube® videos, etc. On the other hand, the audio switching device 16 may control the audio source 12 to mute the audio if the audio source 12 provides live audio such as, but not limited to, a telephone conversation, FM radio feed, Satellite radio feed, High Definition radio or any other live stream of audio content from an audio source 12.

In operation 88, the audio switching device 16 transmits the audio from the newly detected audio source 12 to the headphones 14 to enable playback of the audio from the newly detected audio source 12 at the headphones 14.

In operation 90, the audio switching device 16 continues to transmit the previous audio from the previous audio source 12 to the headphones 14 given that the user elected to reject the request from the audio switching device 16 to provide the audio from the newly detected audio source 12.

In operation 92, the audio switching device 16 does not transmit the new audio from the newly detected audio source 12 to the headphones 14. In this case, the audio switching device 16 transmit a signal to the audio source 12 to either pause the transmission of the audio or to reject the transmission of the audio from the audio source 12. For example, the audio switching device 16 may control the audio source 12 to pause the playback of the audio from the audio source 12 if the audio source 12 provides audio via a local or remote network (e.g., cloud) such as audio in the form of MP3 songs, Ted Talks®, You Tube® videos, etc. On the other hand, the audio switching device 16 may control the audio source 12 to reject the audio if the audio source 12 provides any live audio content such as from a telephone conversation, FM radio feed, Satellite radio feed, HD radio feed or any other live stream of audio content from an audio source 12.

Figure 4:
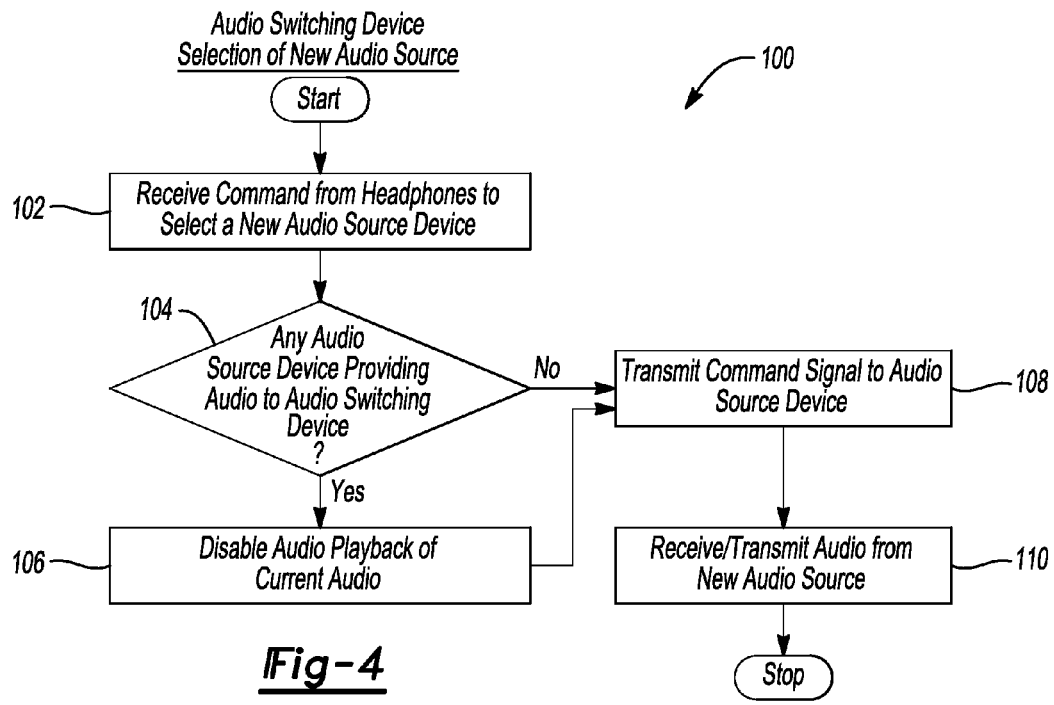
FIG. 4 generally depicts an operational flow of the audio switching device in accordance to another embodiment.

FIG. 4 generally depicts an operational flow 100 of the audio switching device 16 in accordance to another embodiment. The operational flow 100 generally illustrates, but is not limited to, the selection of the newly detected audio source 12.

In operation 102, the audio switching device 16 receives a command from the headphones 14 to select the newly detected audio source 12. In this case, the user may select the newly detected audio source 12 via the audio switching device 16 without the audio switching device 16 prompting the user to do so. For example, the user may select the next source switch 28a on the headphones 14. The headphones 14 may then transmit the command which indicates the user's desire to switch to a new audio source 12 without being prompted by the audio switching device 16 to do so.

In operation 104, the audio switching device 16 determines whether any audio source 12 is presently providing audio for transmission to the headphones 14. If the audio switching device 16 determines that an audio source 12 is presently providing audio, then the flow 100 moves to operation 106. If not, then the flow 100 moves to operation 108.

In operation 106, the audio switching device 16 stops transmitting the audio from the audio source 12 (i.e., the deselected audio source 12).

In operation 108, the audio switching device 16 transmits a command to the selected audio source 12 to transmit the audio.

In operation 110, the audio switching device 16 receives the audio from the selected audio source 12 and transmits the same to the headphones 14 for playback.

Figure 5:
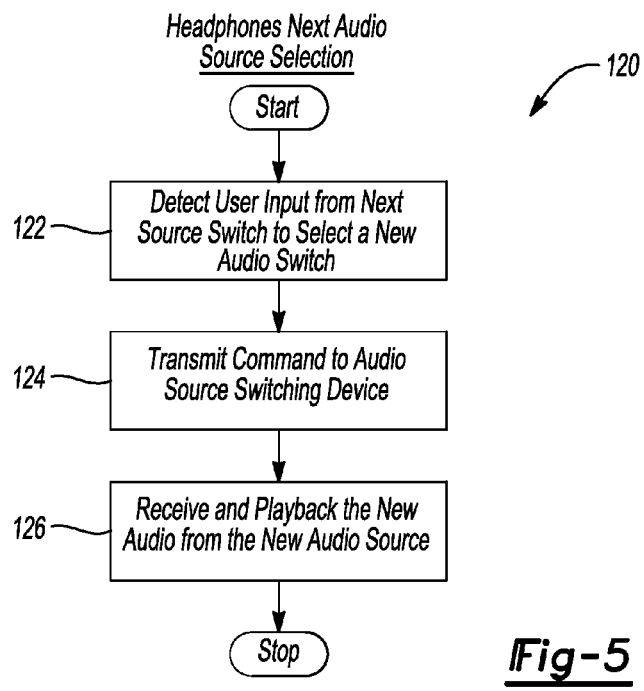
FIG. 5 generally depicts an operational flow of headphones in accordance to one embodiment.

FIG. 5 generally depicts an operational flow 120 of the headphones 14 in accordance to one embodiment. The operational flow 100 generally illustrates, but is not limited to, the selection of a new audio source 12 to provide audio for playback.

In operation 122, the headphones 14 detect that that user selected the next source switch 28a. It is recognized that the user may select the next source switch 28a when it is desired to first select the audio source 12 without being prompted by the audio switching device 16 to select a newly detected audio source 12.

In operation 124, the headphones 14 transmit a command to the audio switching device 16 to request that the audio switching device 16 selects an audio source 12 that is ready to provide audio.

In operation 126, the headphones 14 receive the audio from the audio switching device 16 and enables audio play back for the user. For example, the audio switching device 16 selects the requested audio source 12, receives the audio from the requested audio source 12, and transmits the audio from the requested audio source 12 to the headphones 14.

FIG. 6 generally depicts an operational flow 150 of the headphones 14 in accordance to one embodiment. The operational flow 150 generally illustrates, but is not limited to, the selection of a new audio source 12 to provide audio for playback in response to a request from the headphones 14. Additionally, the operational flow 150 illustrates, but is not limited to, the rejection of a new audio source 12 in response to a request from the audio switching device 16. As noted above, the audio switching device 16 detects that a newly detected audio source 12 that is ready to provide audio to the headphones and the audio switching device 16 transmits the request in response to detecting the new audio source 12.

In operation 152, the headphones 14 receive a request from the audio switching device to change the audio source 12 to the newly detected audio source 12.

In operation 154, the headphones 14 initiate a timer in response to receiving the request.

In operation 156, the headphones 14 determine whether the user selected the respond switch 28b while the timer is running. If the headphones 14 detect that the user selected the respond switch 28b while the timer is running, then the operational flow 150 moves to operation 158. If not, then the operational flow 150 moves to operation 162.

In operation 158, the headphones 14 transmit a command to the audio switching device 16 to indicate to the audio switching device 16 to select and provide audio from the newly detected audio source 12.

In operation 160, the headphones 14 receive the audio from the newly detected audio source 12 via the audio switching device 16 and enables play back of the same for the user.

In operation 162, the headphones 14 determine whether the user selected the reject switch 28c while the timer is running. If the headphones 14 detect that the user selected the reject switch 28c while the timer is running, then the operational flow 150 moves to operation 164. If not, then the operational flow 150 moves to operation 166.

In operation 164, the headphones 14 transmits a command to the audio switching device 16 to reject the request and to indicate that the user desires to maintain the current play back of audio from the current audio source 12.

In operation 166, the headphones 14 determine whether the timer has expired. If the timer has expired, then the operational flow 150 moves to operation 168. If not, then the operational flow 150 moves back to operation 156.

In operation 168, the headphones 14 determine that the user did not respond and plays back the existing audio for the user.

While embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
headphones programmed to:
playback first audio from an audio switching device that is electrically paired to a first audio source that provides the first audio;
receive a first signal from the audio switching device that is electrically paired to a second audio source, the first signal being indicative of a request to transmit second audio from the second audio source while the headphones playback the first audio;
generate an alert to notify a user of the request in response to the first signal; and
transmit a second signal to the audio switching device indicative of a first command to one of receive the second audio at the headphones for playback and reject the request to transmit the second audio,
wherein the headphones are further programmed to wirelessly receive the first audio from the audio switching device via a first wireless communication protocol,
wherein the headphones are further programmed to wirelessly receive the second audio from the audio switching device via the first wireless communication protocol,
wherein the audio switching device is programmed to wirelessly receive the first audio from the first audio source via a second wireless communication protocol,
wherein the audio switching device is further programmed to wirelessly receive the second audio from the second audio source via the second wireless communication protocol;

wherein the headphones are not electrically paired to the first audio source while receiving the first audio from the audio switching device;

wherein the headphones are not electrically paired to the second audio source while receiving the second audio from the audio switching device; and wherein the headphones include a next source switch positioned thereon that enables the headphones to provide a command to the audio switching device over the first wireless communication protocol to control the audio switching device to automatically switch from the first audio source to the second audio source to: (i) provide the second audio to the audio switching device via the second wireless communication protocol and (ii) provide the second audio to the headphones via the first wireless communication protocol from the audio switching device without any user intervention.

2. The system of claim 1 wherein the headphones are further programmed to initiate a timer in response to the first signal.

3. The system of claim 2 wherein the headphones include a switch positioned thereon and wherein the headphones are further programmed to transmit the second signal to the audio switching device to receive the second audio at the headphones in response to the switch being selected by the user.

4. The system of claim 3 wherein the headphones are further programmed to transmit the second signal to the audio switching device to receive the second audio at the headphones in response to the switch being selected by the user prior to an expiration of the timer.

5. The system of claim 2 wherein the headphones include a switch positioned thereon and wherein the headphones are further programmed to reject the request to transmit the second audio in response to the switch being selected by the user of the headphones.

6. The system of claim 5 wherein the headphones are further programmed to reject the request to transmit the second audio in response to the switch being selected by the user of the headphones prior to an expiration of the timer.

7. The system of claim 1 wherein the audio switching device is configured to:

pause the first audio if the first audio source provides the first audio via a local network or from a cloud server, and mute the first audio if the first audio corresponds to a live audio stream including one of a frequency modulated (FM) radio feed and a Satellite Feed, and a High Definition radio feed.

8. The system of claim 1, wherein the first wireless communication protocol and the second wireless communication protocol are a BLUETOOTH protocol.

* * * * *